Patented Nov. 16, 1926.

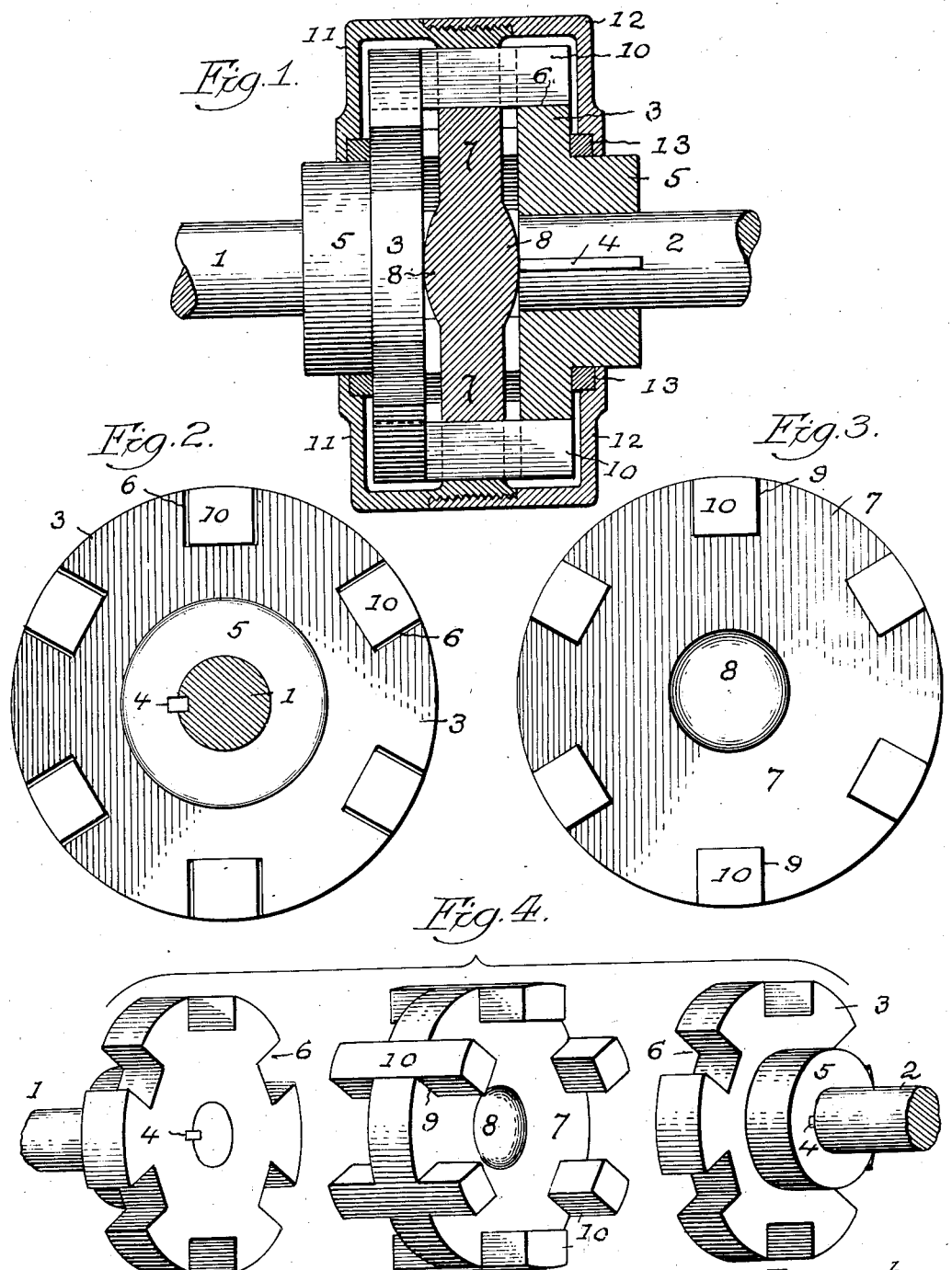

1,607,362

UNITED STATES PATENT OFFICE.

EDWARD J. POWERS, OF OAK PARK, ILLINOIS.

FLEXIBLE COUPLING FOR SHAFTING.

Application filed April 1, 1925. Serial No. 19,851.

This invention relates to that class of flexible couplings for shafting adapted to permit limited lateral movement and rotation of the coupled shafting sections when out of axial alignment, and the present improvement has for its object:—

To provide a structural formation and combination of coupling parts providing a strong and durable structure in which replacement of parts can be attained in a ready and economical manner, all as will hereinafter more fully appear.

In the accompanying drawing:

Fig. 1 is a longitudinal sectional elevation of the coupling parts in assembled relation on the adjacent ends of sections of shafting.

Fig. 2 is a sectional end elevation of one of the coupling heads fixedly carried on a shafting end.

Fig. 3 is an end elevation of the loose or intermediate head of the coupling.

Fig. 4 is a perspective view of the coupling parts in a separated condition.

Like reference numerals indicate like parts in the several views.

In the present coupling structure the respective shaft ends 1 and 2 to be coupled carry an individual head 3 of a disk form fixedly attached to the shaft end by a keyway and key 4, or other usual means of fixed attachment between the parts. In the preferred construction each head 3 is formed with a hub 5, cylindrical in form, for the double purpose of a stronger connection to a shaft end and to afford a bearing surface for a hereinafter described packing gland of the sectional enclosing casing of the structure.

The heads 3 are of a counterpart formation, and arranged in separated relation one to the other to provide space for the intermediate head 7 hereinafter described, and each head is formed with a series of peripheral recesses 6 for the reception of the end portions of the hereinafter described connecting rails 10.

The intermediate head 7 above referred to, is of a circular disk shape having central nodes or enlargements 8 for bearing contact with the adjacent faces of the heads 3 aforesaid. The head 7 is also formed with a series of peripheral recesses 9 complementary to the recesses of the head 3, aforesaid, but of a slightly less width for the purpose hereinafter stated.

The connecting rails 10 aforesaid are of a rectangular shape and of a length approximating the distance between the outer faces of the heads 3, and the arrangement is such that the mid-length portion of each connecting rail will have a drive fit in a recess 9 of the intermediate head in a direction from the periphery to the center of head 7, while the respective ends of said tie rail will have a loose fit in a recess 6 of the pair of heads 3 aforesaid. The connecting rails 10 are formed of hardwood or similar strong and semi-rigid material, as for instance, indurated fibre, to afford a limited degree of flexibility necessary to an effective working of the device.

The above described members are contained in a closed casing adapted to contain a filling of oil, and such casing preferably comprises a pair of cup shaped complementary sections 11 and 12 screwed or otherwise attached at the meeting point of the sections, and each section carries a packing gland 13 for contact with the periphery of a hub portion 5 of an adjacent head 3, as shown.

Having thus fully described my invention, what I claim and desire to secure by Letters Patent is:—

1. In a flexible shaft coupling, the combination of a pair of outer circular heads formed for fixed attachment on adjacent ends of sections of shafting, an intermediate circular head arranged between said outer heads in separated relation thereto, the perimeter of each of the heads being formed with a plurality of rectangular recesses opening into said perimeter, and a plurality of rectangular rails resting in the recesses of the heads to form operative connections between the heads, the construction permitting of the connecting rails being forced inwardly for holding engagement in the recesses of the intermediate head aforesaid.

2. In a flexible shaft coupling, the combination of a pair of outer circular heads formed for fixed attachment on adjacent ends of sections of shafting, an intermediate circular head arranged between said outer heads in separated relation thereto, the perimeter of each of the heads being formed with a plurality of rectangular recesses opening into said perimeter, and a plurality of rectangular rails resting in the recesses of the heads to form operative connections between the heads, the construction permitting of the connecting rails being forced inwardly for holding engagement in the recesses of the aforesaid intermediate head, the intermediate head having central convex projections on its respective faces for bearing contact with the adjacent faces of the pair of outer circular heads.

Signed at Chicago, Illinois this 26th day of March 1925.

EDWARD J. POWERS.